US010972889B2

(12) United States Patent
Ho

(10) Patent No.: US 10,972,889 B2
(45) Date of Patent: Apr. 6, 2021

(54) DUAL-SYSTEM LOCK

(71) Applicant: REAL LOCKS & SECURITY CO., LTD., New Taipei (TW)

(72) Inventor: Hsi-Hao Ho, New Taipei (TW)

(73) Assignee: REAL LOCKS & SECURITY CO., LTD., New Taipei (TW)

( * ) Notice: Subject to any disclaimer, the term of this patent is extended or adjusted under 35 U.S.C. 154(b) by 0 days.

(21) Appl. No.: 16/600,544

(22) Filed: Oct. 13, 2019

(65) Prior Publication Data

US 2020/0137541 A1 Apr. 30, 2020

(30) Foreign Application Priority Data

Oct. 30, 2018 (TW) .................................. 107138433

(51) Int. Cl.
*H04B 5/00* (2006.01)
*G07C 9/00* (2020.01)
*H04W 4/80* (2018.01)

(52) U.S. Cl.
CPC .......... *H04W 4/80* (2018.02); *G07C 9/00309* (2013.01); *G07C 9/00571* (2013.01); *H04B 5/0031* (2013.01); *H04B 5/0037* (2013.01)

(58) Field of Classification Search
CPC ...... H04B 5/00; H04B 5/0031; H04B 5/0037; H04B 7/00; H04B 5/0056; H04B 5/02; H04W 4/80; G07C 9/00
See application file for complete search history.

(56) References Cited

U.S. PATENT DOCUMENTS 10,096,183 B2 * 10/2018 Nitu ................... G07C 9/00904

2016/0035163 A1 * 2/2016 Conrad ................. G01S 5/0027
340/5.61
2018/0123645 A1 * 5/2018 Jang ..................... G06K 7/0008
2018/0365773 A1 * 12/2018 Han ..................... G06F 16/2264
2019/0333301 A1 * 10/2019 Imanuel ................... G07C 9/28

FOREIGN PATENT DOCUMENTS

TW M415952 U 11/2011

OTHER PUBLICATIONS

Office Action dated Jan. 29, 2019 of the corresponding Taiwan patent application.

* cited by examiner

*Primary Examiner* — Blane J Jackson
(74) *Attorney, Agent, or Firm* — Chun-Ming Shih; HDLS IPR Services

(57) ABSTRACT

A dual-system lock includes a lockset including a combination lock and a near field communication. The combination lock includes a contact. The near field communication includes a contacting pin. A mobile apparatus transmits a signal to the near field communication. The near field communication determines and verifies whether a verification code of the mobile apparatus is correct or not. If the near field communication determines that the verification code of the mobile apparatus is correct, the contacting pin of the near field communication is connected and contacted to the contact of the combination lock, and the near field communication transmits a message including a number to the mobile apparatus, wherein the number is a correct unlocking number. If the near field communication determines that the verification code of the mobile apparatus is incorrect, the near field communication does not transmit the message to the mobile apparatus.

6 Claims, 5 Drawing Sheets

DUAL-SYSTEM LOCK

BACKGROUND OF THE INVENTION

Field of the Invention

The present invention relates to a lockset, and especially relates to a dual-system lock proceeding reaction and decryption for the lockset of a combination lock by a mobile apparatus with a near field communication apparatus.

Description of the Related Art

A lockset is a security tool, which is an apparatus invented for protecting the user's life and property that can be just unlocked with keys. With the development of the lockset nowadays, the lockset has become a sealed apparatus which is unlocked with keys, passwords, circuits or other tools. The lockset prevents goods from being opened, unlocked, stolen and removed; the lockset has the effect of protection, management and even decoration.

Formerly both the house door lock that the user uses keys to unlock the lockset and the cabinet that the user uses keys to unlock the cabinet lock are easily knocked and the stuff are easily stolen. Therefore, in order to prevent the bad man, many house door locks and many cabinet locks of the cabinets are designed as the combination locks. After the user just sets the passwords based on the user's favorite, and after a plurality of character wheels on the lockset are rotated or a plurality of buttons are pressed, when the corresponding password matches with (namely, is equal to/conforms to) the set password, the lockset can be unlocked.

Although the combination lock can effectively prevent the bad man, the user cannot unlock the house doors or the locksets of the cabinets once the user forgets the passwords, so it is inconvenient.

SUMMARY OF THE INVENTION

Therefore, the main object of the present invention is to solve the conventional disadvantages. The present invention provides a mobile apparatus having the near field communication apparatus to sense the lockset to read the password set by the user originally, so that the user can unlock the lock.

In order to achieve the object mentioned above, the present invention provides a dual-system lock. The mobile apparatus having the near field communication apparatus reads a lockset equipped with the near field communication inside. The lockset comprises a combination lock and a near field communication (circuit/unit). The combination lock comprises a contact. The near field communication comprises a contacting pin. Moreover, the mobile apparatus is configured to transmit a signal to the near field communication of the lockset. The near field communication is configured to determine and verify whether a verification code of the mobile apparatus is correct or not. If the near field communication determines that the verification code of the mobile apparatus is correct, the contacting pin of the near field communication is connected and contacted to the contact of the combination lock, and the near field communication is configured to transmit a message with a number to the mobile apparatus, wherein at this time the number is a correct unlocking number. If the near field communication determines that the verification code of the mobile apparatus is incorrect, the near field communication is configured to cease transmitting (namely, the near field communication does not transmit) the message to the mobile apparatus.

In an embodiment of the present invention, the near field communication comprises a micro-controller, a storage unit and an antenna. The micro-controller comprises a plurality of general-purpose input/output sides. The storage unit is connected to the micro-controller. The micro-controller is configured to convert/compose a detected data into an encrypted data and is configured to store the encrypted data in the storage unit. The antenna is electrically connected to the micro-controller.

In an embodiment of the present invention, the general-purpose input/output sides are the contacting pin of the near field communication.

In an embodiment of the present invention, the storage unit is a memory.

In an embodiment of the present invention, when the combination lock is a character wheel type, each of character wheels of the combination lock comprises an internal sleeve. Each of the internal sleeves comprises a contact to be electrically contacted with the general-purpose input/output sides of the micro-controller.

In an embodiment of the present invention, the combination lock is a button type. Each of buttons of the combination lock corresponds to an internal sleeve. Each of the internal sleeves comprises a contact to be electrically connected to the general-purpose input/output sides of the micro-controller.

In an embodiment of the present invention, the combination lock is an electronic rotating disc lock. Each of rotating discs of the electronic rotating disc lock is a contact that is electrically connected to the general-purpose input/output sides of the micro-controller.

DETAILED DESCRIPTION OF THE INVENTION

Figure 1:
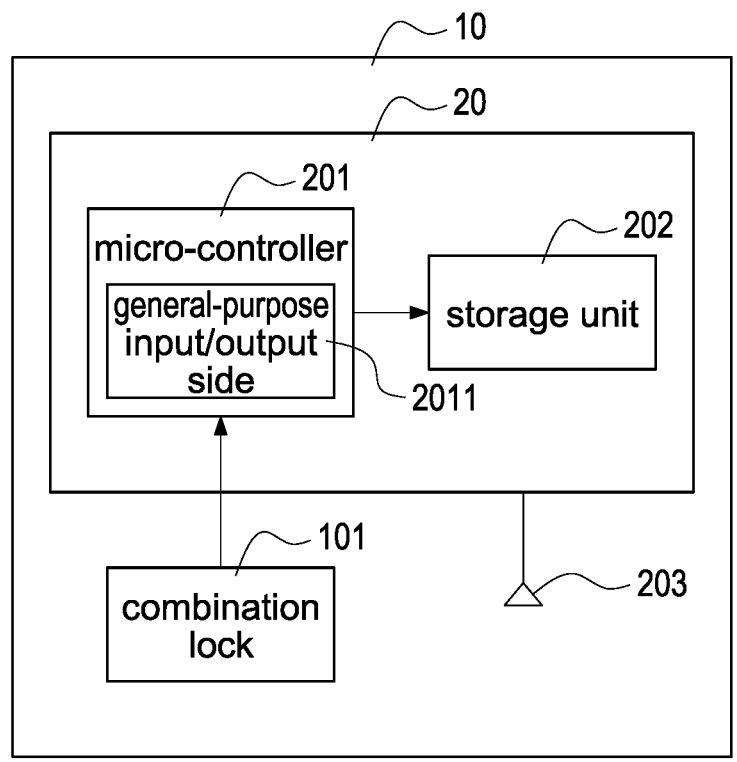
FIG. 1 shows a block diagram of the lockset of the dual-system lock of the present invention equipped with the near field communication circuit inside.
Figure 1:
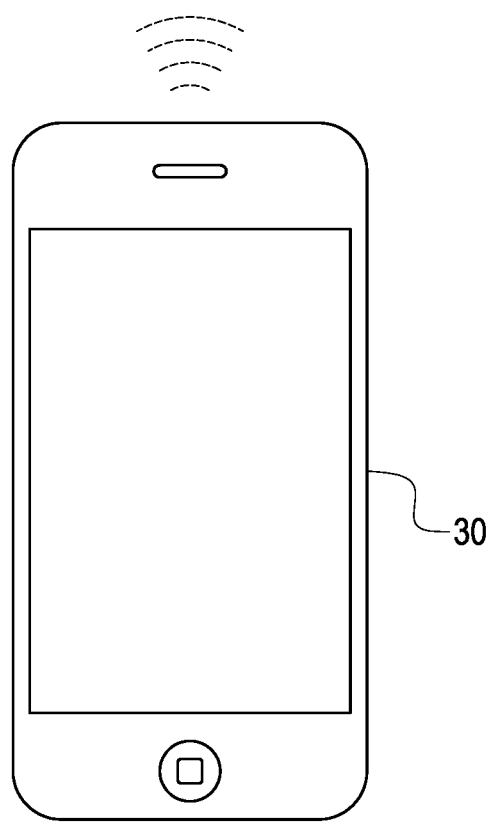

Now please refer to the figures for the explanation of the technical content and the detailed description of the present invention:

FIG. 1 shows a block diagram of the lockset of the dual-system lock of the present invention equipped with the near field communication dynamic tag circuit inside. As shown in FIG. 1, the dual-system lock of the present invention comprises a lockset 10 and a mobile apparatus 30. The lockset 10 comprises a combination lock 101 and a near field communication (circuit/unit) 20, which is abbreviated as NFC in the following content. The NFC 20 comprises a contacting pin (not shown in FIG. 1). The combination lock 101 comprises a contact (not shown in FIG. 1). The mobile apparatus (display apparatus) 30 reads the NFC 20. When the mobile apparatus 30 transmits a signal to the NFC 20 of the lockset 10, the NFC 20 determines and verifies whether a verification code of the mobile apparatus 30 is correct or not. If the NFC 20 determines that the verification code of the mobile apparatus 30 is correct, the contacting pin of the NFC 20 is connected (contacted) to the contact of the combination lock 101, and the NFC 20 transmits a message with a number to the mobile apparatus 30, wherein at this time the number is a correct unlocking number. If the NFC 20 determines that the verification code of the mobile apparatus 30 is incorrect, the NFC 20 ceases transmitting (namely, the NFC 20 does not transmit) the message to the mobile apparatus 30, to prevent the combination lock 101 from sending the message when anyone's mobile apparatus 30 approaches. In FIG. 1, the lockset 10 is a character wheel type rotation, a button pressed type or an electronic rotating disc lock.

The NFC 20 further comprises a micro-controller (namely, MCU) 201, a storage unit 202 and an antenna 203. The micro-controller (MCU) 201 provides a plurality of general-purpose input/output sides 2011, which are the contacting pin of the NFC 20. After the general-purpose input/output (GPIO) sides 2011 are electrically contacted with each contacts of the combination lock 101, and after the general-purpose input/output sides 2011 receive a potential variation generated by a contact of an internal sleeve (not shown in FIG. 1) of the combination lock 101, the micro-controller 201 converts/composes it into an encrypted data.

The storage unit 202 is connected to the micro-controller 201. The micro-controller 201 converts/composes a detected data into the encrypted data and then stores the encrypted data in the storage unit 202. In FIG. 1, the storage unit 202 is a memory.

When the user is in the usage process after the lockset 10 is set the password, if the user forgets the password, the user utilizes the mobile apparatus 30 with the NFC apparatus to sense the NFC 20 inside the lockset 10, and connects and supplies power to the micro-controller 201 through an encrypted communication interface. At this time, the NFC 20 determines and verifies whether the verification code of the mobile apparatus 30 is correct or not. If the NFC 20 determines that the verification code of the mobile apparatus 30 is correct, after the user rotates or presses the contact of the internal sleeve of the combination lock 101 to generate the potential variation, the micro-controller 201 detects and composes an encrypted data. The encrypted data is sent to the storage unit 202 and is stored in the storage unit 202, and the NFC 20 transmits the message with the number to the mobile apparatus 30, wherein at this time the number is a correct unlocking number.

If the NFC 20 determines that the verification code of the mobile apparatus 30 is incorrect, the NFC 20 ceases transmitting (namely, the NFC 20 does not transmit) the message to the mobile apparatus 30.

Figure 2:
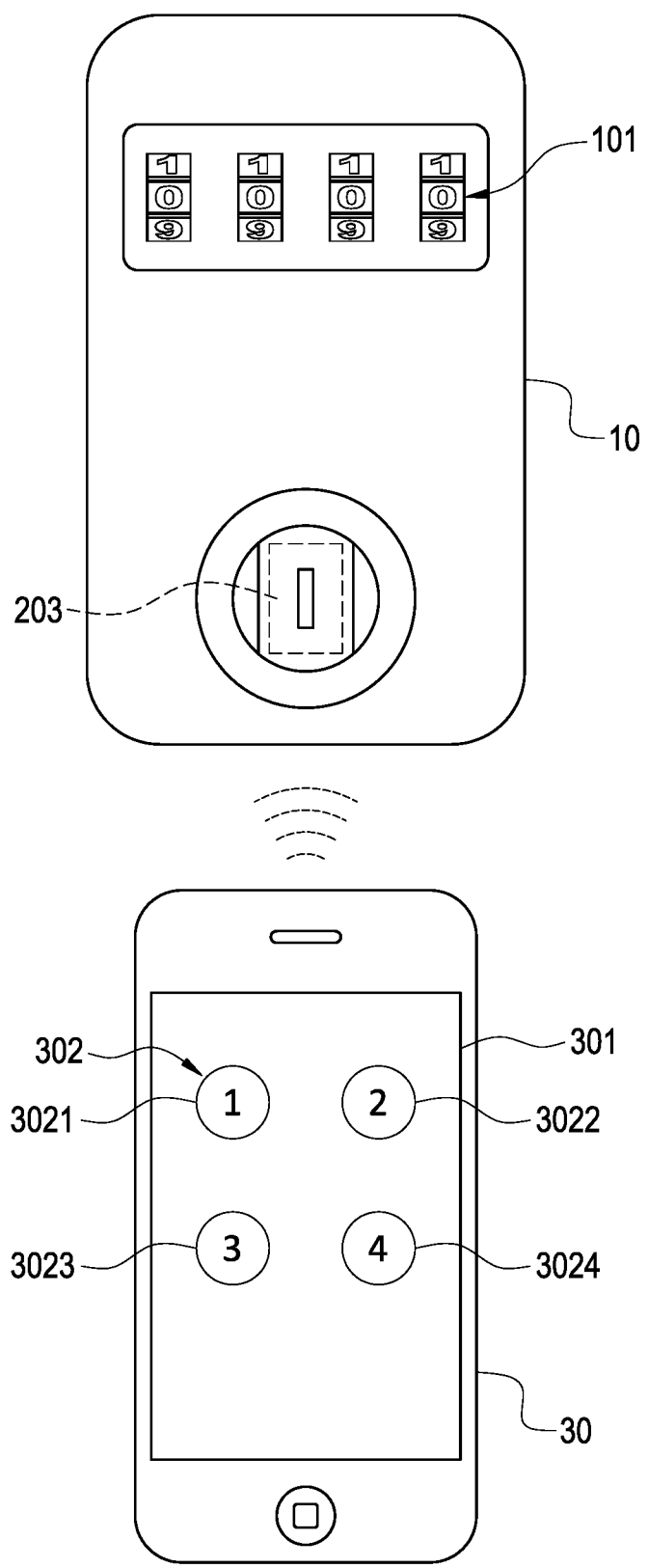
FIG. 2 shows an external view of an application embodiment of the combination lock of the present invention with four character wheels.
Figure 3:
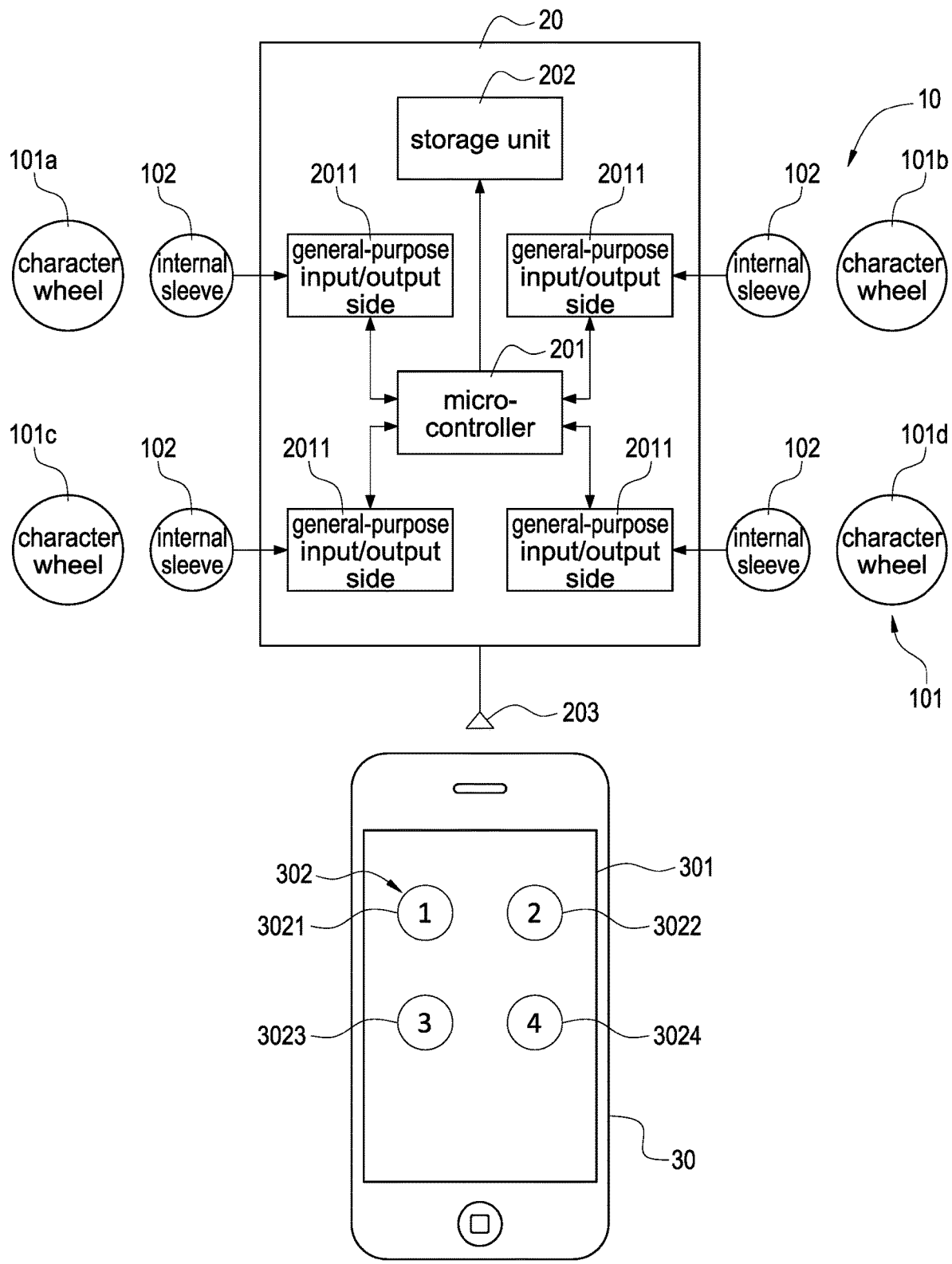
FIG. 3 shows a block diagram of the combination lock with four character wheels in FIG. 2 and the near field communication circuit.
Figure 4:
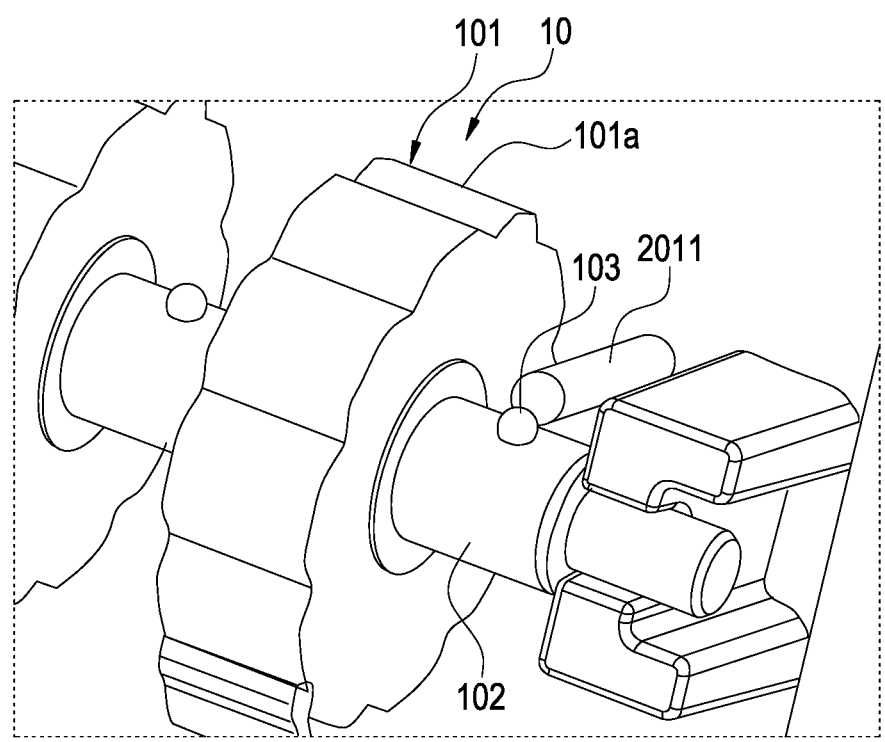
FIG. 4 shows a structure of a single character wheel in FIG. 2.

FIG. 2 shows an external view of an application embodiment of the combination lock of the present invention with four character wheels. FIG. 3 shows a block diagram of the combination lock with four character wheels in FIG. 2 and the near field communication circuit. FIG. 4 shows a structure of a single character wheel in FIG. 2. Please refer to FIG. 1 at the same time. As shown in the figures, when the present invention is applied with the lockset 10 having four character wheels, and when each combination locks 101 is a character wheel 101a, each character wheels 101a comprises an internal sleeve 102. The character wheel 101a and the internal sleeve 102 are separated when setting numbers, and are combined when locking. Each internal sleeve 102 comprises a contact 103 which is electrically contacted with the general-purpose input/output sides 2011 (namely, the contacting pin of the NFC 20) of the micro-controller 201.

The user voluntarily sets the password of the lockset 10 as "1234". The password setting is the conventional technology and is not described here. In the user's usage process, if the user forgets the password, the user utilizes the mobile apparatus 30 with the NFC apparatus to sense the NFC 20 inside the lockset 10, and connects and supplies power to the micro-controller 201 through the encrypted communication interface. Then, the NFC 20 determines and verifies whether the verification code of the mobile apparatus 30 is correct or not. If the NFC 20 determines that the verification code of the mobile apparatus 30 is correct, when the user rotates the first character wheel 101a from 1 to 0, and when the first character wheel 101a is rotated to the correct angle (for example, the number is 1), the contact 103 of the first internal sleeve 102 combined with the first character wheel 101a generates the potential variation, and after the general-purpose input/output sides 2011 (namely, the contacting pin of the NFC 20) of the micro-controller 201 receives, the encrypted data is composed/generated. The encrypted data is sent to the storage unit 202. At the same time, the NFC 20 sends the message with the number to the mobile apparatus 30, wherein at this time the number is the correct unlocking number. At this time, a first column 3021 of a display 301 of the mobile apparatus 30 displays the number "1".

And so on, after the user sequentially rotates the second character wheel 101b, the third character wheel 101c and the fourth character wheel 101d, until the second column 3022, the third column 3023 and the fourth column 3024 of the display 301 of the mobile apparatus 30 respectively displays "2", "3" and "4" sequentially, the user can unlock the combination lock 101.

If the NFC 20 determines that the verification code of the mobile apparatus 30 is incorrect, the NFC 20 ceases transmitting (namely, the NFC 20 does not transmit) the message to the mobile apparatus 30.

Figure 5:
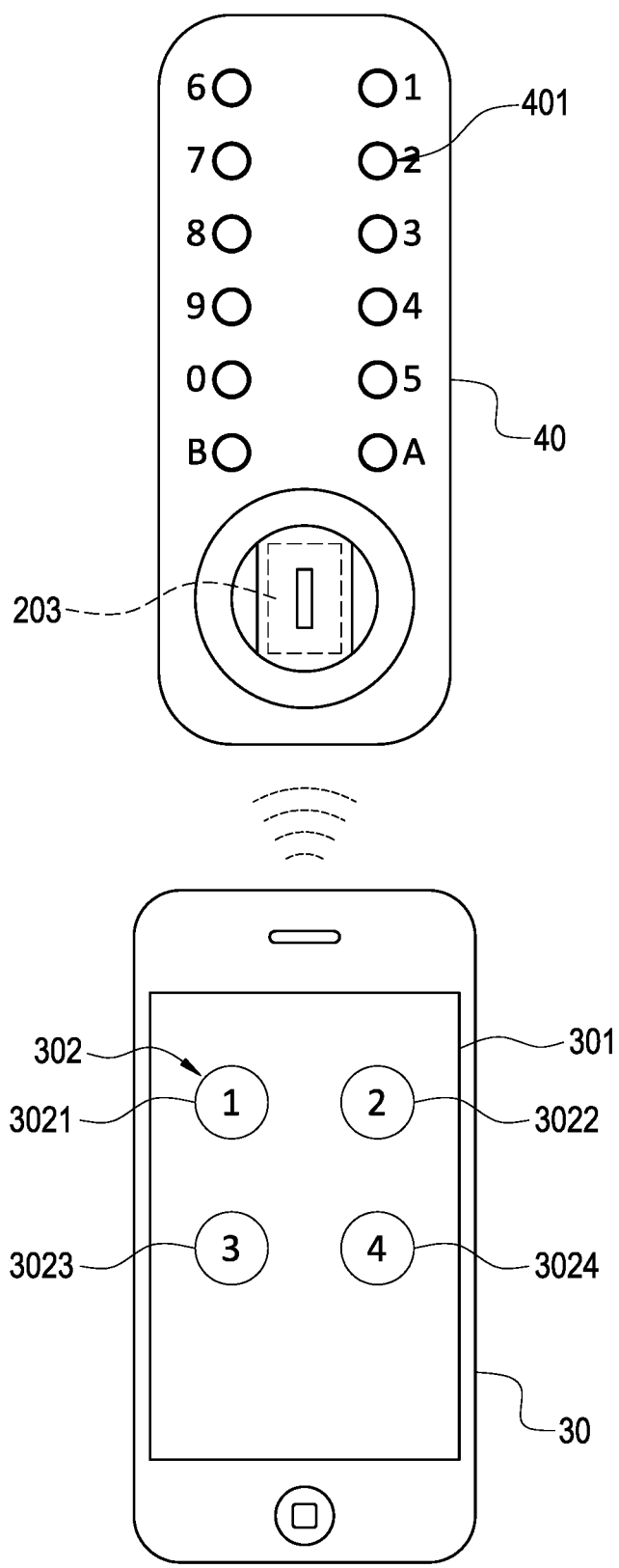
FIG. 5 shows an external view of an application embodiment of the button type combination lock of the present invention.

FIG. 5 shows an application embodiment of the button type lockset of the present invention.

Please refer to FIG. 1 at the same time. As shown in FIG. 5, when the present invention is applied with the button type lockset 40, each button 401 of each combination lock 101 corresponds to an internal sleeve (not shown in FIG. 5). Each internal sleeve comprises a contact to be electrically contacted with the general-purpose input/output sides 2011 of the micro-controller 201.

The password of the lockset 40 is "1234". The password setting is the conventional technology and is not described here. In the user's usage process, if the user forgets the password, the user utilizes the mobile apparatus 30 with the NFC apparatus to sense the NFC 20 inside the lockset 40, and connects and supplies power to the micro-controller 201 through the encrypted communication interface. Then, the NFC 20 determines and verifies whether the verification code of the mobile apparatus 30 is correct or not. If the NFC 20 determines that the verification code of the mobile apparatus 30 is correct, when the user verifies the password of the first column, firstly the buttons 401 from "1" to "B" are pressed. If the password number of the first column is "1", a contact (not shown in FIG. 5) of the internal sleeve corresponding to the button 401 of the number "1" generates the potential variation. At this time, after the potential variation is received by the general-purpose input/output sides 2011 of the micro-controller 201, an encrypted data is composed/generated. The encrypted data is sent to the storage unit 202. At the same time, the NFC 20 sends the message with the number to the mobile apparatus 30, wherein at this time the number is the correct unlocking number. The first column 3021 of the display 301 of the mobile apparatus 30 displays the number "1".

And so on, after the user sequentially verifies the second column 3022, the third column 3023 and the fourth column 3024, until the second column 3022, the third column 3023 and the fourth column 3024 of the display 301 of the mobile apparatus 30 respectively displays "2", "3" and "4" sequentially, the user can unlock the lockset 40.

If the NFC 20 determines that the verification code of the mobile apparatus 30 is incorrect, the NFC 20 ceases transmitting (namely, the NFC 20 does not transmit) the message to the mobile apparatus 30.

Further, besides being applied with the character wheel type rotation or the button pressed type lockset mentioned above, the present invention can be applied with a rotating disc type electronic rotating disc lock as well. Each rotating disc on the electronic rotating disc lock is used as a contact. When the user utilizes the mobile apparatus 30 with the NFC apparatus to sense the electronic rotating disc lock, the NFC inside the electronic rotating disc lock determines and verifies whether the verification code of the mobile apparatus 30 is correct or not. If the NFC determines that the verification code of the mobile apparatus 30 is correct, the user can rotate a rotating seat of the electronic rotating disc lock to drive and rotate the rotating disc, and the NFC sends the unlocking number to the mobile apparatus 30 to display.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system lock comprising a mobile apparatus and a lockset, the lockset comprising:

a combination lock; and a near field communication circuit for communication with the mobile apparatus, the near field communication circuit being connected to the combination lock, wherein the mobile apparatus is configured to transmit a signal to the near field communication circuit; the near field communication circuit is configured to determine and verify whether a verification code of the mobile apparatus is correct or not; if the near field communication circuit determines that the verification code of the mobile apparatus is correct, the near field communication circuit is configured to transmit a message with a number to the mobile apparatus, wherein the number is a correct unlocking number; if the near field communication circuit determines that the verification code of the mobile apparatus is incorrect, the near field communication circuit is configured not to transmit the message to the mobile apparatus.

2. The system lock of claim 1, wherein the near field communication circuit comprises a storage unit.

3. The system lock of claim 2, wherein the storage unit is a memory.

4. The system lock of claim 2, wherein the combination lock is a character wheel type; each of character wheels of the combination lock comprises an internal sleeve.

5. The system lock of claim 2, wherein the combination lock is a button type; each of buttons of the combination lock corresponds to an internal sleeve.

6. The system lock of claim 2, wherein the combination lock is an electronic rotating disc lock.

* * * * *